United States Patent Office 3,172,946
Patented Mar. 9, 1965

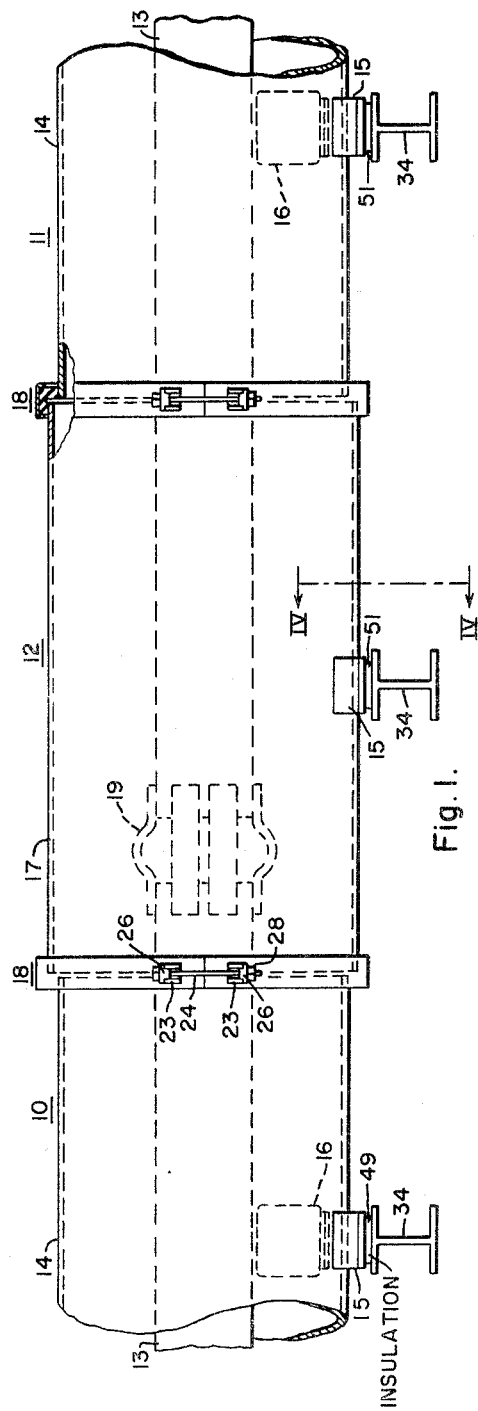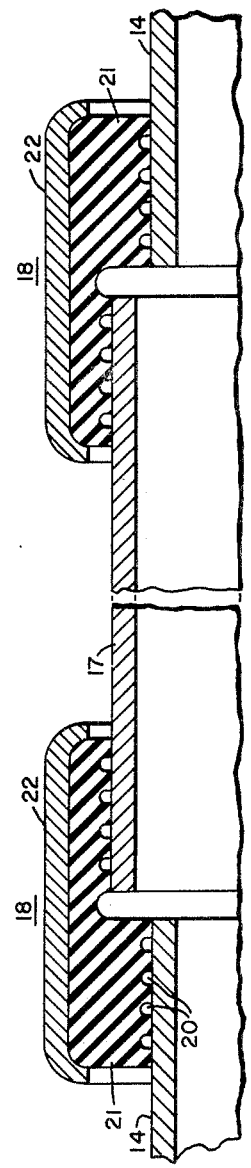
INVENTOR
Glen L. Claybourn

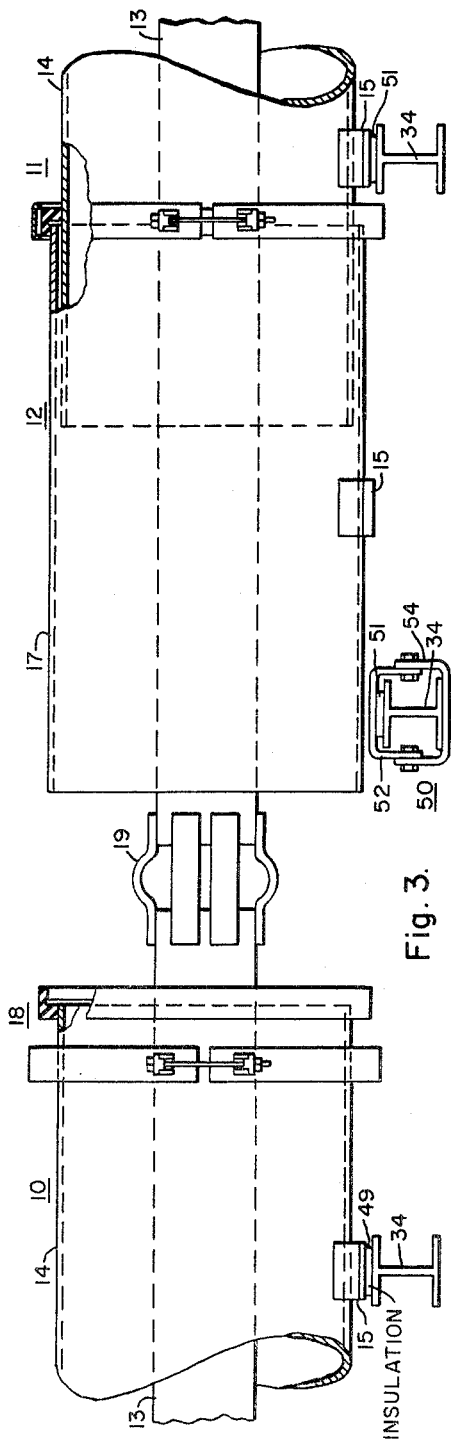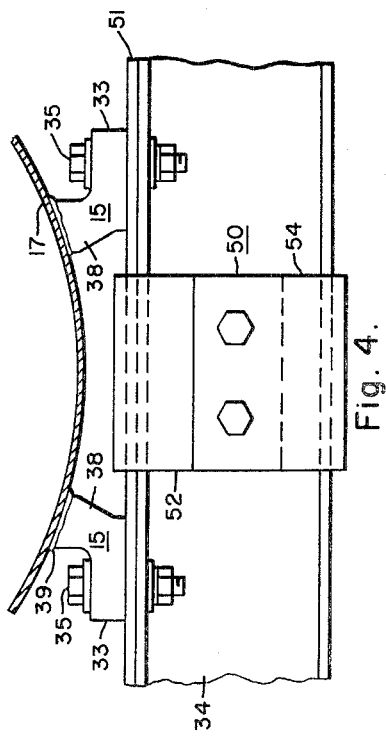

3,172,946
ISOLATED PHASE BUS STRUCTURES
Glen L. Claybourn, Forest Hills Borough, Pittsburgh, Pa., assignor to Westinghouse Electric Corporation, East Pittsburgh, Pa., a corporation of Pennsylvania
Filed Jan. 24, 1962, Ser. No. 168,468
2 Claims. (Cl. 174—85)

This invention relates, generally, to electrical bus structures and, more particularly, to metal-enclosed isolated phase bus structures of the type described in a copending application Serial No. 752,325, filed July 31, 1958 by H. H. Rugg and H. B. Wortman which issued October 30, 1962 as U.S. Patent 3,061,665.

In the bus structure described in the aforesaid application, each phase enclosure of a multi-phase bus structure comprises a plurality of supporting sections and intermediate enclosures which telescope on the supporting sections. Circumferential gaskets are provided at the joints between sections and the intermediate enclosures. Each supporting section comprises a cylindrical housing having two supporting feet attached thereto near each end of the housing. Each foot has a rectangular portion which projects through a hole in the housing and has tapped holes therein for attaching one end of a steel strap or plate, thereby providing a resilient mounting for an insulator which supports a bus conductor inside the housing. The feet are sealed to the housing by external welds. The intermediate enclosures are also cylindrical in shape and one end of each enclosure overlaps one end of a housing section to completely enclose the bus conductor.

When the adjacent conductors of an alternating current bus structure are surrounded by metal enclosures of reasonably high electrical conductivity, such as aluminum, they are shielded from the magnetic flux of the other phases. This reduces the mechanical stress between phase conductors, when carrying heavy short circuit currents, to less than 25 percent of the stress when the conductors are unshielded.

One of the problems in isolated phase bus structures is to so construct the main bus and the bus enclosure that they will not exceed a specified temperature rise of, for example, 50° C. on all parts of the main bus and 30° C. rise on all parts of the bus enclosure. This requirement is difficult to meet on isolated phase bus structures having a rating of 6000 amperes and above.

Temperature tests on high current isolated phase bus structures similar to the one described in the aforesaid copending application, above a 7000 ampere rating, show that the heat generated in the short telescopic section enclosure causes the temperature of the main bus, especially in the center phase, to rise to such an extent that the main bus will not meet temperature ratings. Other tests show that the peaks of high temperature of the enclosure are where the telescopic sections overlap the fixed sections of the enclosure which are insulated from each other. The extreme heating in the overlapping joints is due to the end turn effect of the high circulating current in each enclosure.

It has been proven by tests that this heating can be greatly reduced by making the telescopic sections of stainless steel which has a resistance 32 times greater than the same cross-sectional area of aluminum. This does reduce the circulating current in the telescopic sections, but it also reduces the shielding current effect under short circuit conditions and increases the short circuit forces between the bus conductors.

Accordingly, an object of this invention is to provide an isolated phase structure which will not have excessive temperature rises at its rated current capacity and in which the forces between conductors are not excessive at short circuit currents.

Another object of this invention is to provide a three point support for each movable housing section of an isolated phase bus enclosure.

Other objects of the invention will be explained fully hereinafter or will be apparent to those skilled in the art.

In accordance with one embodiment of the invention, each phase enclosure of a multi-phase bus structure comprises a plurality of fixed cylindrical supporting sections and movable cylindrical housing sections disposed between adjacent ends of the fixed sections. The ends of a movable section do not overlap the adjacent fixed sections, but each movable section is of a greater diameter than the fixed sections to permit the movable section to be moved longitudinally over an adjacent fixed section. Each movable section is removably attached to a supporting structure substantially midway between its ends which are supported by gaskets and clamping bands which overlie adjacent ends of the movable section and a fixed section.

For a better understanding of the nature and objects of the invention, reference may be had to the following detailed description, taken in conjunction with the accompanying drawings, in which:

FIGURE 1 is a view, in side elevation, of a portion of an isolated phase bus structure embodying the principal features of the invention;

FIG. 2 is an enlarged view, in section, of the gasketed joints between sections of the enclosure;

FIG. 3 is a view, similar to FIG. 1, showing the movable section opened for inspection of the bus; and FIG. 4 is an enlarged view, taken along the line IV—IV in FIG. 1.

Referring to the drawings, and particularly to FIG. 1, the bus structure shown therein comprises two spaced fixed supporting sections 10 and 11 and an intermediate or movable section 12. Each supporting section comprises a bus conductor 13, a cylindrical housing 14, two pairs of supporting feet 15, only one pair of which is shown in the drawings, and an insulator 16 for each pair of supporting feet. The housing 14 may be formed from heat treated aluminum sheets welded into a complete cylinder. Each foot 15 may be extruded from aluminum.

The movable section 12 comprises a cylindrical housing 17 which is of a slightly larger diameter than the housing 14. The housing 17 is preferably formed in a manner similar to the housing 14 from conducting sheet material, such as aluminum, which will provide a shielding current effect under short circuit conditions. As shown, the ends of the housing 17 are spaced from the ends of the housing 14 and the joints between the housing are sealed by gasket assemblies 18 which will be described more fully hereinafter. The adjacent ends of the bus bars 13 are joined by flexible connectors 19 or splice plates which may be bolted or welded to the bus bars.

As shown more clearly in FIGS. 1 and 2, each gasket assembly 18 comprises a circumferential gasket 21, which has a cross section generally of an angle or L-shape, a clamping band 22, the cross section of which is generally straight with inturned edges to fit the contour of the gasket 21, clamping lugs 23, welded to the band 22, and two clamping bolts 24. The gasket 21 may be formed from a high grade neoprene rubber vulcanized into an endless ring. As shown, one horizontal portion of the gasket, which is relatively thin, engages the outside of the movable section 17. The other horizontal portion, which is relatively thick, engages the outside of the support section 14. The gasket 21 spans the gap between adjacent ends of the housing sections 14 and 17. The gasket is compressed against the enclosure by the clamping band 22 which is shaped to fit the outside of the gasket. The band 22 is preferably made from a non-magnetic material, such as stainless steel, which has high mechanical strength and which has a relatively much higher resistance to the flow of induced current than the material from which the shielding housing 17 is made. As shown in FIG. 2, the gasket has a plurality of grooves 20 in its horizontal legs, thereby providing multiple line contact with the housing surfaces.

Each clamping band is preferably made in two semi-cylindrical halves with the clamping bolts 24 joining the two halves together. As shown in FIG. 1, a washer 26 is disposed between one lug 23 and the head of the bolt 24. Another similar washer 26 is disposed between a nut 28 on the bolt and the lug 23 on the other half of the band 22. Thus, when the nut 28 on the bolt 24 is tightened, the gasket 21 is compressed against both the housing sections to seal the joint between the housings. A similar clamping bolt 24 connects the other ends of the two halves of the band 22, thereby applying a uniform pressure on the gasket 21.

Referring to FIG. 2, it will be seen that the ends of the telescoping section 17 are spaced from the supporting sections 14. Since the gasket 21 is of sufficient thickness to prevent the band 22 from touching the housings even when compressed, the housings are insulated from each other. In this manner the gasket 21 insulates the housings against circulating currents at each joint. Flexible jumpers may be added across the joints where necessary to ground all enclosures.

As shown more clearly in FIG. 4, each supporting foot 15 comprises a base 33, which may be attached to a cross beam 34 by bolts 35, and a portion 38 which may be welded to the housing 17 by an external weld 39. Thus, the feet 15 and the gasket assemblies 18 constitute a three point support for the housing section 17. In order to substantially prevent or minimize any heating of the supporting cross-beams 34, which are usually formed from steel, due to the magnetic flux produced by current flow in the main bus, a short-circuiting turn or band 50 is provided around each cross-beam 34 between each pair of the supporting feet 15 for each phase of the three-phase bus. Each band 50 comprises upper and lower generally U-shaped members 52 and 54, respectively, which are both formed from a highly conductive material, such as copper or aluminum. The induced current in the band 50 produces a magnetic flux that opposes or counteracts the magnetic flux produced by current flow in the main bus and thus minimizes the heating in the associated cross-beam 34.

In the interest of simplicity, the band 50 is shown in FIGS. 3 and 4 of the drawing on only one cross-beam 34. It will be understood that bands may be provided on all of the cross-beams of the supporting structure.

As described in the aforesaid copending application, the two portions 38 for each pair of feet 15 for the housing sections 14 project through openings in the housing and are spaced from each other inside the housing 14 and are spanned by a steel plate or strap which is attached to each portion 38 by tap bolts. The insulator 16 is attached to the strap by tap bolts which are threaded into an insert on the lower end of the insulator 16. The bus conductor 13 may consist of two channel members welded together with spacing plates at intervals to form a hollow square. The conductor 13 is attached to the insulator 16 by means of a clamping plate and tap bolts which are threaded into an insert in the upper end of the insulator 16.

Thus, the insulator 16 is resiliently supported by the strap, thereby permitting the insulator to withstand the forces resulting from short circuit currents in the bus conductors. As explained hereinbefore, the mechanical stress between phase conductors which are enclosed in metal housings of reasonably high electrical conductivity is reduced to a relatively small percentage of the stress between conductors which are not enclosed or shielded. Accordingly, the insulators 16 which are resiliently mounted, are enabled to withstand the forces resulting from heavy short circuit currents.

As shown in FIG. 3, the movable section 17 may be moved along one of the housing sections 14 after the clamping assemblies 18 are loosened and the bolts 35 are removed from the feet 15 which support the section 17. Thus, access may be had to the flexible connectors 19 which join the bus bars 13. Since the supporting feet 15 are located a short distance from each end of the supporting housing 14, access to the insulator at each end of the supporting housing may be had by moving the telescoping section in the proper direction to permit access to the desired insulator for inspection and maintenance of the insulators and any bolted connections. The movable section may be moved in either direction by loosening both clamping assemblies.

It will be understood that the supporting sections of the enclosure are usually assembled in three phase groups on the cross-beams 34. One end of each supporting section may be insulated from the cross-beam by an insulating member 49. The other end may be connected to a ground bus 51, thereby grounding the enclosure. Adjacent phase enclosures may be tied together in the manner described in Patent 2,531,017 to strengthen the structure.

Since the movable housing section 17 does not overlap the fixed housing sections 14 when the bus structure is in service and conducting current, the overheating caused by the overlapping joints in prior structures is avoided. The only structural member which overlaps the fixed and movable sections of the bus enclosure, aside from the insulating gasket member 21, is the band 22 which is formed from a relatively high resistance material to minimize any possible heating at the joints. The movable housing section is rigidly supported by the three point support comprising the two gasket assemblies 18 and the feet 15. The movable section may be moved longitudinally in either direction by loosening the gasket assemblies and removing the bolts from the supporting feet, thereby providing access to the interior of the enclosure.

The housing sections may be made from aluminum or other metal having a relatively high conductivity, thereby retaining the shielding effect which reduces the mechanical stress between phase conductors when carrying heavy short circuit currents. Thus, the present structure has all the advantages of prior structures and the additional advantage of permitting the bus to carry high currents without excessive heating.

Since numerous changes may be made in the above-described construction and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. In an isolated phase bus structure, in combination, a first cylindrical housing section, a second cylindrical housing section spaced longitudinally from the first section, a third cylindrical housing section disposed between the first and the second sections, said housing sections being formed from a conductive material, the diameter of the third section being greater than the diameter of the other sections, the third section being shorter longitudinally than the distance between the adjacent ends of the other sections to avoid overlapping of the ends of said third section and said other sections, a conductor disposed inside said housing sections, supporting means disposed externally of the housing sections for supporting said housing sections, a gasket having a generally L-shaped cross-section for spanning the gap between adjacent ends of the housing sections and overlying the adjacent ends, each gasket having a relatively thin portion engaging the outer periphery of one end of the third housing section and a relatively thick portion engaging the outer periphery of the adjacent end of one of the other housing sections, clamping means compressing each gasket against the housing sections, said clamping means being formed from a non-magnetic material having a relatively higher resistance to the flow of induced currents than the material of said housing sections, and insulators disposed inside the first and the second sections for supporting the conductor.

2. An isolated phase bus structure comprising, two fixed cylindrical housing sections spaced longitudinally from each other, a movable cylindrical housing section disposed between said fixed housing sections, the length of the movable section being less than the distance between the ends of the two fixed sections to avoid overlapping of the ends of said movable section and said fixed sections, said housing sections being formed from a conductive material, the diameter of the movable section being greater than the diameter of the fixed sections, a conductor disposed inside the housing sections, insulators mounted inside the fixed sections for supporting the conductors, supporting means disposed externally of the housing sections for supporting said housing sections, a gasket spanning the gap between adjacent ends of the housing sections and overlying the adjacent ends, clamping means compressing each gasket against the housing sections, said clamping means being formed from a non-magnetic material having a relatively higher resistance to the flow of induced current than the material of said housing sections, said gasket and clamping means cooperating with said external supporting means to constitute a three-point support for the movable housing section, and said movable housing section being movable longitudinally along either one of the fixed housing sections when the movable section is detached from the external supporting means and the clamping means are loosened.

References Cited in the file of this patent
UNITED STATES PATENTS

| | | |
|---|---|---|
| 1,975,602 | Halperin et al. | Oct. 3, 1934 |
| 2,892,012 | Swerdlow et al. | June 23, 1959 |
| 3,061,665 | Rugg et al. | Oct. 30, 1962 |